United States Patent [19]

Bellagamba

[11] 4,028,859

[45] June 14, 1977

[54] HEAT-INSULATING PANELS

[76] Inventor: Pietro Bellagamba, Via A Porta 4, 29100 Piacenza, Italy

[22] Filed: May 6, 1976

[21] Appl. No.: 683,856

[30] Foreign Application Priority Data

May 14, 1975 Italy .................. 23335/75

[52] U.S. Cl. .................. 52/393; 52/489; 52/618

[51] Int. Cl.$^2$ .................. E04B 2/32; E04B 2/88

[58] Field of Search ........... 52/235, 489, 618, 629, 52/630, 478, 394, 403, 563, 393, 593, 391, 508, 511, 582

[56] References Cited

UNITED STATES PATENTS

| 2,073,130 | 3/1937 | Wallace | 52/386 |
|---|---|---|---|
| 2,205,725 | 6/1940 | Kavanagh | 52/630 |
| 3,248,836 | 5/1966 | Monk | 52/434 |
| 3,386,218 | 6/1968 | Scott | 52/403 |
| 3,453,795 | 7/1969 | Heirich | 52/489 |
| 3,559,358 | 2/1971 | Lohse | 52/235 |

Primary Examiner—John E. Murtagh
Attorney, Agent, or Firm—William Anthony Drucker

[57] ABSTRACT

A heat-insulating panel, particularly adapted for walls of buildings, including two parallel thin ribbed metal sheets covering an intermediate layer, consisting of a heat-insulating resin, in which the said covering metal sheets show in positions corresponding to each other and at a regular distance undercut reliefs projecting on one face whereat there are inserted coupling organs of the said metal sheets, consisting of material having a low thermal conductivity, and on each projecting relief there are fixed movably fastening means to the support structures and the end portions of the two metal sheets are folded over and shaped so as to build a concave edge and a convex edge, which may be coupled by embedding with each other and provided on their inner surfaces with gaskets having a series of longitudinal lamellar reliefs, placed in intercalated positions.

6 Claims, 11 Drawing Figures

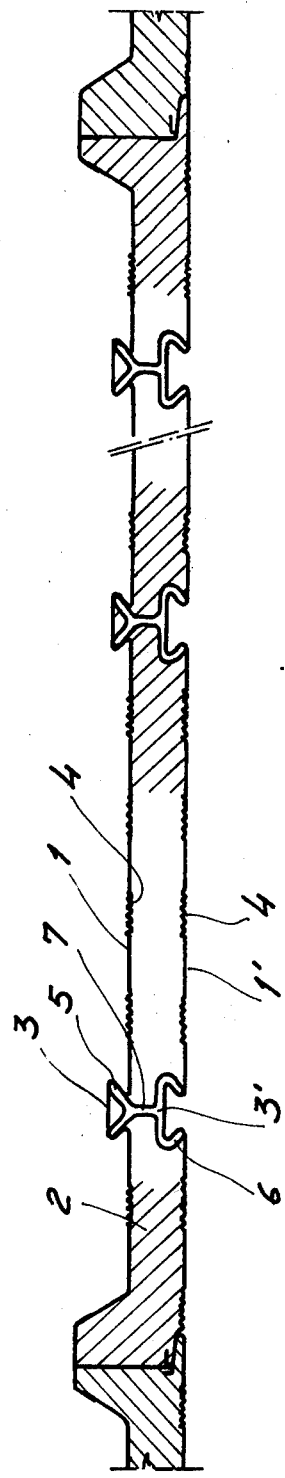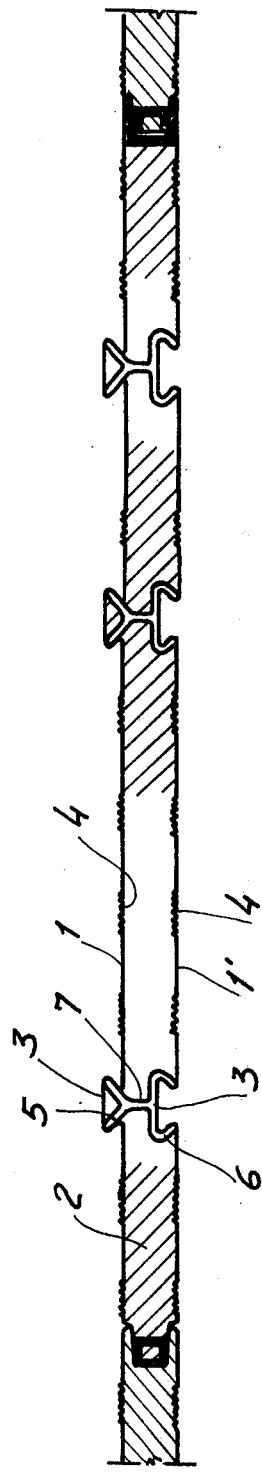

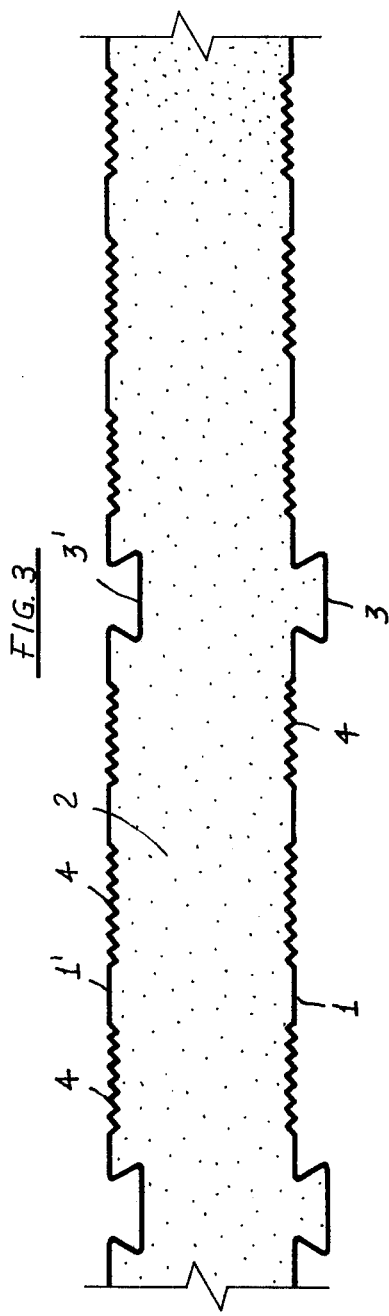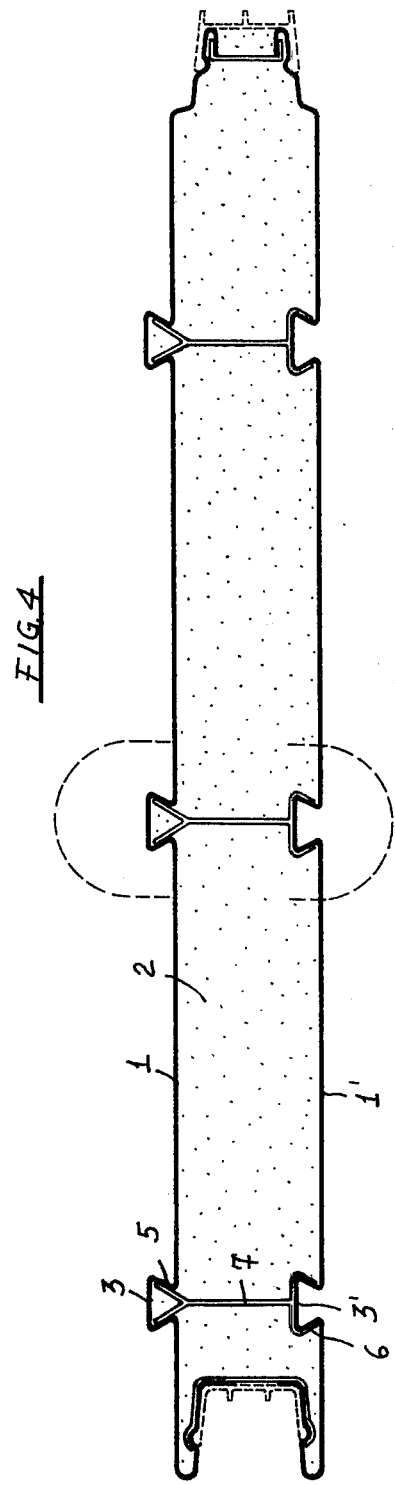

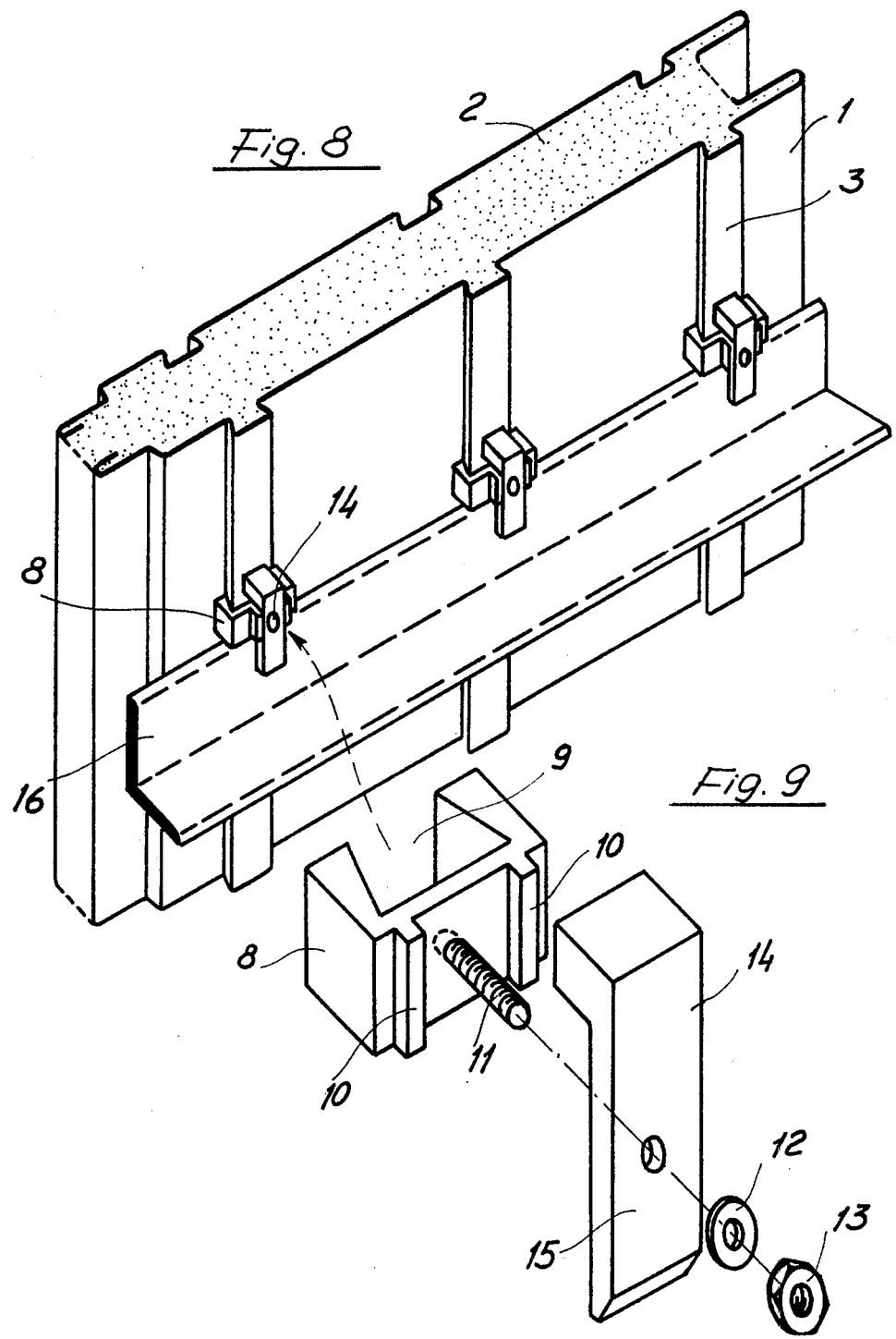

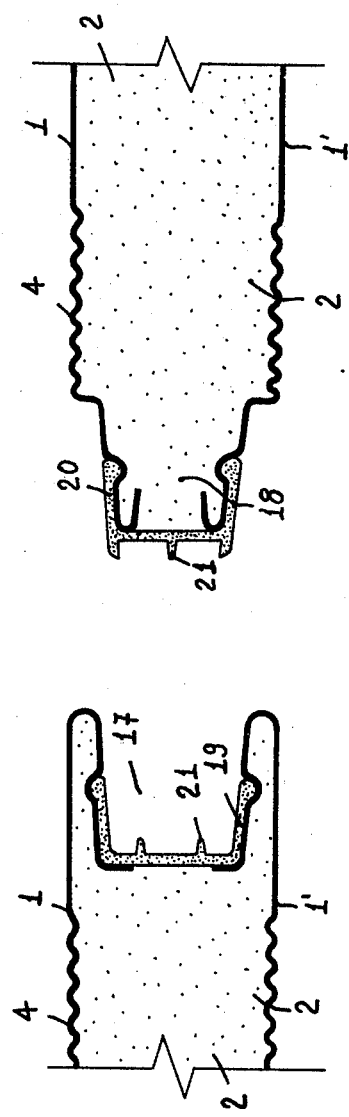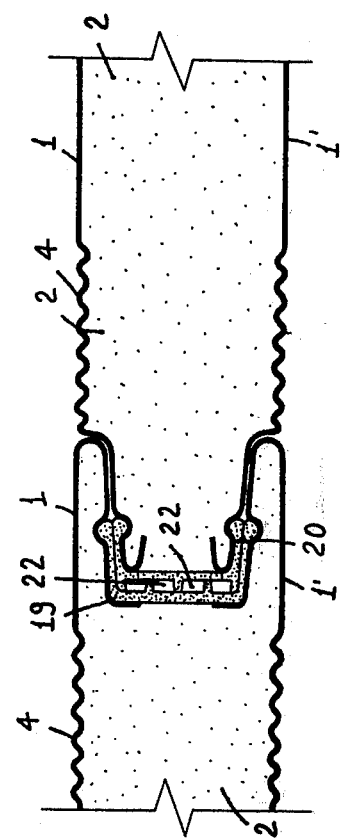

HEAT-INSULATING PANELS

This invention relates to heat-insulating panels and more specifically to heat-insulating panels, consisting of two thin metal sheets, being more or less ribbed, between which there is placed a suitable synthetic resin. The aforesaid heat-insulating panels are generally used as walls of buildings. They show, therefore, a face exposed to the action of the atmospheric agents.

Consequently, the inner insulating core may be dissociated from the covering sheets due to the degradation due to the temperature rises which the heat-insulating panels are subjected to during their use.

It is also well known that the aforesaid heat-insulating panels are generally anchored to suitable support structures by means of screws or bolts, namely by means of connecting through-organs.

Such fastening method implies the drilling of holes in the thickness of the panels and support structures themselves and involves, therefore, an alteration of the aesthetic appearance of the walls in sight.

On the other hand, the possibility of inserting the said connecting organs at the joints between the various panels, maintaining thereby invisible from the outside, limits the number of applicable anchorings, with a consequent reflection on the effective safety requirements.

In both cases, however, there is built between the two covering sheets a thermal bridge, degrading the non-conducting properties of the panel.

Furthermore, the panels being at present commercially available are connected therebetween by embedding of their free edges which are, therefore, shaped male and female. In practice, however, the joint of such panels require the interposition of one or more gaskets, adapted to avoid the infiltrations at the joints themselves.

The aforementioned gaskets are normally of the compressible type, so that the execution of the coupling between two panels takes place by compression of the panel to be added against that already anchored to the support structure. Such operation shows, in practice, considerable difficulties, by also taking into account that the coupling operation is generally carried out in uncomfortable positions and at a certain height, on scaffoldings or the like.

It is, therefore, the object of this invention to provide a heat-insulating panel not showing the above-outlined inconveniences.

These and further objects are obtained by the heat-insulating panel according to the present invention, characterized by the fact that the two covering sheets shows in positions corresponding to each other and at a regular distance reliefs in undercut projecting on a face whereat there are disposed coupling organs consisting of material having a low thermal conductivity and on each projecting relief there are movably fastened fastening means to the support structures.

Furthermore, the end portions of the two sheets are folded over and so shaped as to build a concave and a convex edge, which may be coupled by embedding between them and provided on their inner surface with gaskets having a series of longitudinal lamellar placed in intercalated positions. The said reliefs thus build between the two panels, when embedded therebetween a labyrinth chamber. The coupling organs are preferably made from plastic material and formed by a V-shaped and a C-shaped piece, connected to each other by a spacer member. Of the said pieces, the V-shaped piece is inserted by embedding into the cavity delimited by the relief projecting and the C-shaped piece is fitted over the recessed relief.

The fastening means of the heat-insulating panel of this invention to the support structures consist of a small block provided with an undercut cavity, which may be prismatically coupled with the reliefs of the panel. The said block shows two vertical slides and thereto there is fixedly secured a small bar embedding into the said vertical slides and serves as an anchoring member to the support structure.

These and further characteristic features of a functional and constructional nature of the heat-insulating panel of this invention could better be understood from the following detailed description, taken in conjunction with the accompanying drawings, which represent a preferred embodiment form given by way of non-limiting example, in which:

FIGS. 1 and 2 show the longitudinal sections of two heat-insulating panels according to this invention;

FIG. 3 represents the longitudinal section of an enlarged panel portion, not provided with the coupling organs;

FIG. 4 shows designed the longitudinal section of the panel in FIG. 3 provided with the coupling organs;

FIG. 8 shows the heat-insulating panel of this invention in a perspective view, fastened to a support structure;

FIG. 9 depicts an exploded view of the fastening means;

FIG. 10 shows designed the edges likely to be coupled with each other of two specimens of the heat-insulating panel of this invention; and FIG. 11 represents the coupling between the two specimens of the panel in FIG. 10.

Figure 5:
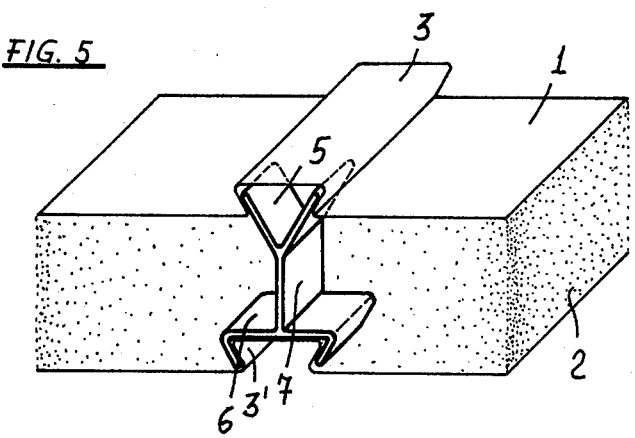
FIGS. 5 and 6 and 7 represent according to three possible construction modifications, the perspective schematic view of the connecting member between the covering sheets of the inner insulating core.
Figure 6:
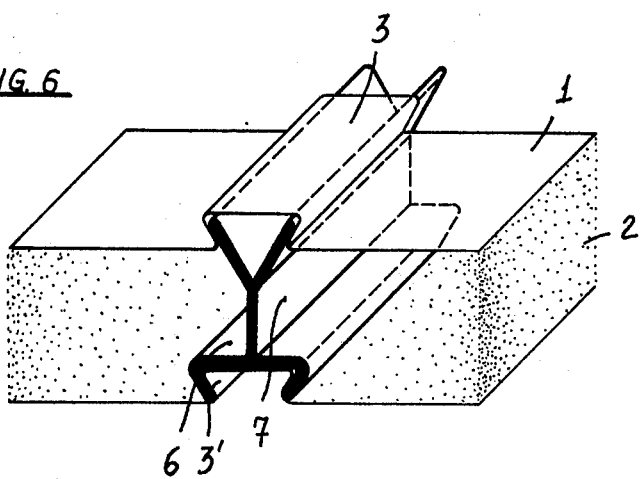
Figure 7:
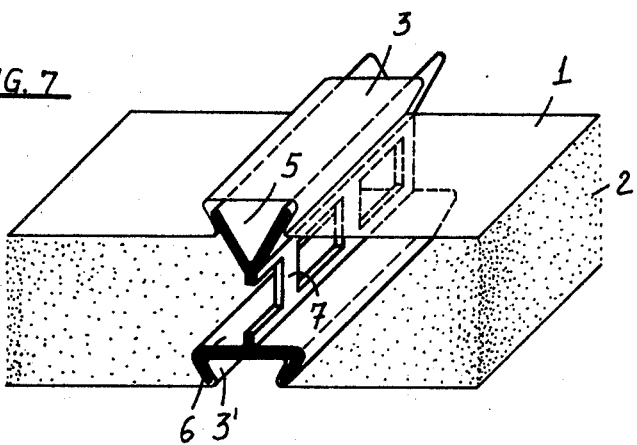

Referring now particularly to the reference numerals in the various figures on the accompanying drawings, the heat-insulating panel of this invention is made up of a pair of parallel metal sheets 1 and 1' between which there is placed a layer 2, consisting of a suitable heat-insulating material. Transversally of such sheet pieces there are formed in corresponding positions and at regular distance undercut relief 3 and 3', projecting on the one and the same side of the one of the said sheets 1. On the same sheets there may be present further series of small rigs 5, formed in the interspaces being delimited by the reliefs 3 and 3' referred to above. The said sheets 1 and 1' are connected therebetween at the reliefs 3 and 3' by means of proper coupling organs. Such coupling organs consists substantially of a V-shaped piece 5, which may fit by embedding into the underlying cavity, delimited by the projecting relief 3 and a C-shaped piece 6, which may be fitted over into the cavity of the inwardly turned relief 3'. The aforesaid pieces 5 and 6 may be in particular of a limited width (FIG. 5) and constituted by a continuous shape (FIGS. 6 and 7). The same pieces 5 and 6 are connected by a spacer member 7, which may present in turn both a continuous surface (FIGS. 5 and 6) and a suitably windowed surface (FIG. 7).

The aforesaid coupling organs are likewise made from plastic material or, however, from a material having a low thermal conductivity in order not to affect the incuslating power of the panel.

Over the outwardly projecting reliefs 3 of the panel may be fitted a small-sezed metal block 8 by means of an undercut cavity 9 with which it is provided, which may be prismatically coupled with the reliefs 3.

Such block 8 shows at its outer face two vertical slides 10 and screw pin or an anchoring means 11, being orthogonal to the face itself.

With the said screw there is coupled via a washer 12 and a nut 13 a rod 14, shaped so as to get grip by its free projecting part 15 with a support structure 16 as schematically depicted in FIG. 8.

The end portions of the sheets 1 and 1' referred to above, building the covering of the insulating material core 2 are folded over so as to substantially form a concave edge 17 and a convex edge 18, being likely to be coupled with each other by embedding of the male and female type. To the said concave edge 17 and convex edge 18 there are anchored the gaskets 19 and 20, respectively. The anchoring of the gasket to the edges 17 and 18 is preferably obtained by means of the cavities formed in the inner surface of the edges and into which there are embedded the protuberances of the gaskets 19 and 20. Such gaskets show a series of longitudinal lamellar reliefs 21, disposed in suitably intercalated positions. Consequently, the coupling between the two panels (FIG. 11) is so that the said longitudinal reliefs, by pressing on the opposite gasket, build labyrinth-like closed chambers 22, accomplishing a perfect tightness to the infiltrations. From the foregoing description and from perusal of the various figures on the accompanying drawings one may easily see the greater functional character and the practical laying on site characterizing the heat-insulating panel of this invention.

Upon carrying out this invention several changes and modifications as to shape dimensions and assembly may be introduced therein without departing from the very spirit and scope of the invention itself.

What we claim is:

1. A heat-insulating panel, particularly adapted for walls of buildings, including two parallel thin ribbed metal sheets covering an intermediate layer, consisting of a heat-insulating resin, in which the said covering metal sheets show in positions corresponding to each other and at a regular distance undercut reliefs projecting on one face whereat there are inserted coupling organs of the said metal sheets, consisting of material having a low thermal conductivity, and one each projecting relief there are fixed movably fastening means to the support structures and the end portions of the two metal sheets are folded over and shaped so as to build a concave edge and a convex edge, which may be coupled by embedding with each other and provided on their inner surfaces with gaskets having a series of longitudinal lamellar reliefs, placed in intercalated positions.

2. A heat-insulating panel as defined in claim 1, in which the coupling organs of the two metal sheets are built by a V-shaped piece fitting by embedding into the cavity delimited by the projecting relief, and by a C-shaped piece placed in the cavity of the recessed relief and by a spacer member joining the said pieces each other.

3. A heat-insulating panel as defined in claim 1 in which the two V-shaped and C-shaped pieces and the spacer member building the coupling organ consist of a structural shape extending over the entire panel surface.

4. A heat-insulating panel as defined in claim 1, in which the coupling organs consist of plastic material.

5. A heat-insulating panel as defined in claim 1, in which the fastening means of the panel to the support structure include a small metal block having an undercut cavity coupling prismatically with the reliefs projecting from the panel, the said block being provided on its outer face with two vertical slides and with a screw pin being orthogonal to the said face, to which there is fastened by means of a nut a small bar embedding into the said vertical slides and getting grip with its free projecting portion to the support structure.

6. A heat-insulating panel as defined in claim 1, in which the gaskets are fastened to the internal surface of panel edges by means of the protuberances fitting by embedding into the cavities formed on the surface of the said edges.

* * * * *